United States Patent

Barbehoen

[11] Patent Number: 6,035,832
[45] Date of Patent: *Mar. 14, 2000

[54] METHOD AND DEVICE FOR CONTROLLING A CONTROL ELEMENT IN OPEN LOOP

[75] Inventor: Kai-Lars Barbehoen, Munich, Germany

[73] Assignee: Robert Bosch GmbH, Stuttgart, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 09/055,570

[22] Filed: Apr. 6, 1998

[30] Foreign Application Priority Data

Apr. 10, 1997 [DE] Germany .............................. 197147771

[51] Int. Cl.$^7$ .................................................. F02M 37/04
[52] U.S. Cl. .......................................................... 123/502
[58] Field of Search ................................... 123/500, 501, 123/502, 357

[56] References Cited

U.S. PATENT DOCUMENTS

| | | | |
|---|---|---|---|
| 5,085,190 | 2/1992 | Birk et al. | 123/357 |
| 5,188,084 | 2/1993 | Sekiguchi | 123/502 |
| 5,651,348 | 7/1997 | Wall | 123/502 |

FOREIGN PATENT DOCUMENTS

| | | |
|---|---|---|
| 41 05 740 A1 | 9/1991 | Germany . |
| 2 272 308 | 5/1984 | United Kingdom . |
| 2 273 793 | 6/1994 | United Kingdom . |

*Primary Examiner*—Thomas N. Moulis
*Attorney, Agent, or Firm*—Kenyon & Kenyon

[57] ABSTRACT

A method and a device for controlling a control element, particularly an injection-timing device of a high-pressure fuel pump, in an open loop. A control unit presets a driving value to be applied to the control element. The driving value and a neutral value are applied alternately to the control element.

9 Claims, 2 Drawing Sheets

METHOD AND DEVICE FOR CONTROLLING A CONTROL ELEMENT IN OPEN LOOP

BACKGROUND INFORMATION

The present invention relates to a method and a device for controlling a control element, particularly an injection-timing device of a high-pressure fuel pump, in an open loop. A method and a device for controlling such a control element in closed loop are known, for example, from German Patent No. 41 05 740 (U.S. Pat. No. 5,085,190), which describes a method and a device for the closed-loop control of a control element that influences the start of injection of a high-pressure fuel pump.

Digital feedback control circuits, which are used in particular for controlling such a control element, operate in precisely specified time slices in accordance with the requirements of the controlled system to be regulated. The smaller the selected time slice, the more dynamic, precise and stable the design of the closed feedback control circuit can be.

However, as the time slice is reduced, the need for computing power is simultaneously increased. From this standpoint, there are limits to reducing the time intervals of the recalculation.

SUMMARY OF THE INVENTION

An object of the present invention is to provide a method and a device which will permit a dynamically accurate and stable closed feedback control circuit and, at the same time, assure the lowest possible computer load.

DETAILED DESCRIPTION

Figure 1:
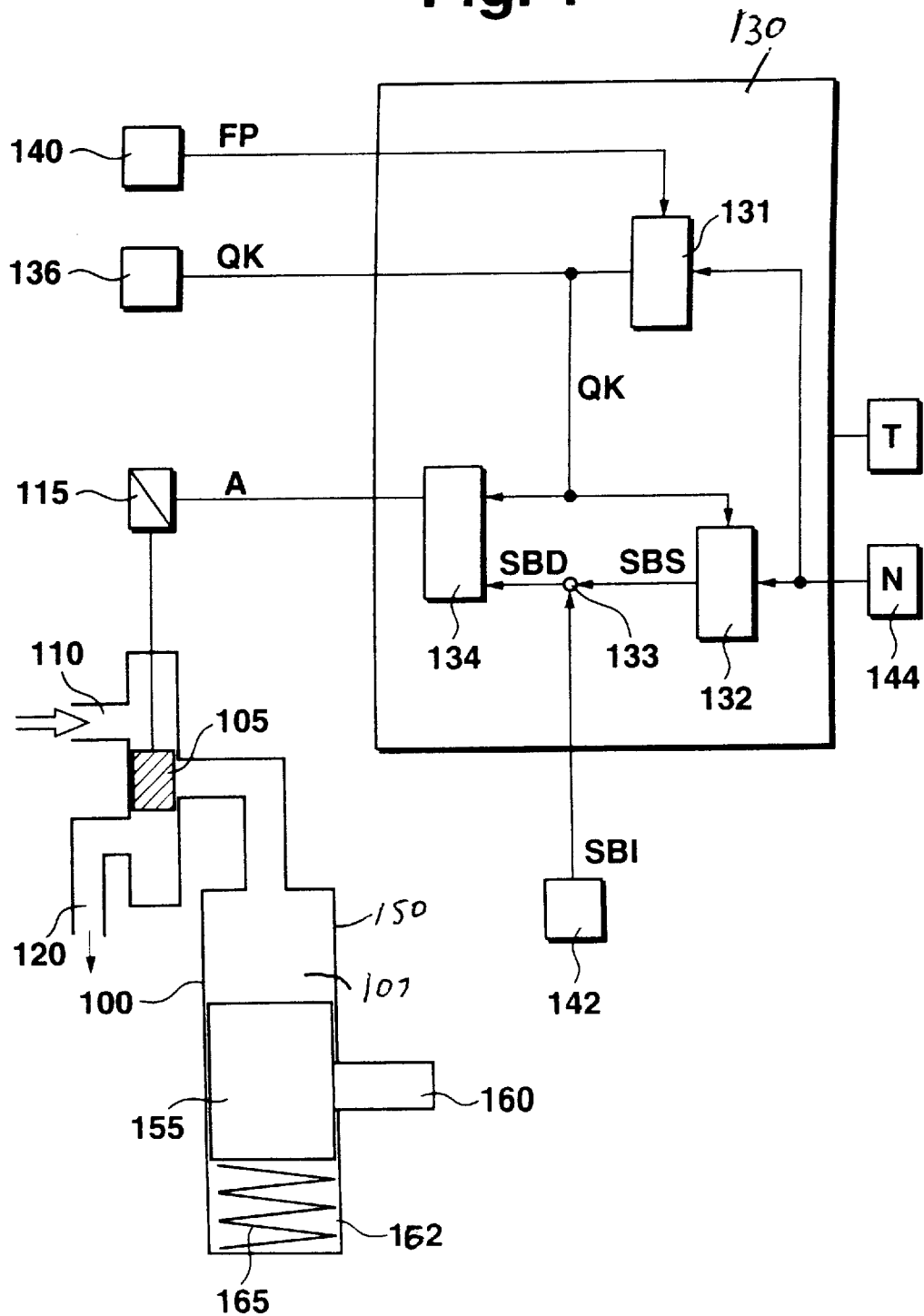
FIG. 1 shows a block diagram of the device of the present invention.

The device of the present invention is shown schematically with the aid of a block diagram in FIG. 1. The method of the present invention is described using an injection-timing device of a distributor injection pump of a diesel gasoline engine as an example. However, it is also applicable to other control elements having similar properties.

An injection-timing device 100 is usually employed for setting the start of pump delivery and/or the delivery rate for distributor injection pumps.

The injection timing device 100 includes an actuating arm 160 which engages with a "roller ring" of the distributor injection pump. The actuating arm 160 is coupled to a timing-device piston 155. Timing-device piston 155 is supported in a guide cylinder 150, and closes off a spring cavity 162 with its one end face and closes off a working chamber 107 with its other end face. A restoring spring 165 braced between timing-device piston 155 and guide cylinder 150 is arranged in spring cavity 162.

A slide valve 105 can be adjusted by means of a coil 115. Depending on the position of slide valve 105, hydraulic fluid can flow from an inlet line 110 to the working chamber 107, or flow from the working chamber 107 to a return line 120.

The start of pump delivery can be adjusted by shifting the timing-device piston 155 and actuating arm 160. If the intention is to advance the start of pump delivery, provisions can be made to shift the timing-device piston 155 downwards. This is achieved by driving coil 115 in such a way that it releases the connection between the inlet line 110 and working chamber 107. This causes pressure to act upon timing-device piston 155, the restoring spring 165 to be compressed, and the timing-device piston 155 to move downwards.

If the intention is to retard the start of pump delivery as a function of the operating conditions, coil 115 is driven so as to release the connection between return line 120 and working chamber 107. As a result, timing-device piston 155 is relieved and moves upwards because of the spring tension, thus retarding the start of pump delivery.

Coil 115 receives driving signals A from a control device 130. In addition, further controlling means 136, such as a volume-flow controller, receives driving signals QK from control device 130. Control device 130 processes various output signals from various sensors. They are, for example, means for specifying a driver's command signal FP 140, a sensor 142 for detecting an actual value SBI, which indicates the actual start of injection and/or the actual position of the timing device, a sensor 144 for detecting a speed signal N and/or a sensor 146 for detecting a temperature value T.

In addition to other elements, control device 130 includes a setpoint selection 131 for injected fuel quantity, which is fed driver's command signal FP and speed N, in addition to other variables not shown. The fuel-quantity setpoint selection 131 makes available a fuel-quantity signal QK. Volume-flow controller 136 receives this signal QK.

Provision is also made for a setpoint selection 132 for receiving fuel-quantity signal QK and speed N, in addition to other variables not shown. Setpoint selection 132 makes available a setpoint value SBS for controlling the injection-timing device in closed loop.

Setpoint value SBS and an actual value SBI are gated in a node 133. The output of node 133 is applied to a timing-device controller 134, which can receive fuel-quantity signals QK as well. Coil 115 receives driving signals from timing-device controller 134.

Using operating parameters, such as at least fuel-quantity signal QK and speed signal N, setpoint selection 132 calculates setpoint value SBS. This setpoint value is compared in node 133 to actual value SBI, and the system deviation SBD is formed. Timing-device controller 134 drives coil 115 using this system deviation SBD as a baseline.

Injection-timing device 100 has integral action. This means that if coil 115 receives a specific signal, this does not lead to a defined position of actuating arm 160. The result of a defined driving signal for coil 115 is a defined inflow or a defined discharge of pressurized media into or out of working chamber 107. As a rule, this causes a continuous shifting of timing-device piston 155 and actuating arm 160, respectively.

In order for timing-device piston 155 to be retained in its position, it is necessary for coil 115 to receive a specific driving signal. A driving signal which results in an inflow or discharge of pressurized media is to be selected only in the event of a system deviation.

Timing-device controller 134 calculates the driving signal to be applied to coil 115 in definitively preselected fixed time intervals. In this context, the design of the controller is such that the driving signal is rated to allow the piston to assume its desired position within the prescribed period of time.

The injection timing device 100 shown demonstrates highly dynamic action, meaning that it could assume its position in substantially shorter time. This in turn means the time intervals during which the driving signal is calculated could be further shortened and the controller designed accordingly. The result would be a faster adjustment of the setpoint value, and a better dynamic performance of the feedback control circuit, but would also result in an increased computer load.

The present invention now provides that timing-device controller 134 is designed for halved time intervals during the calculation. This allows the feedback control circuit, and thus the control element, to react more quickly to changes in setpoint value SBS. The time intervals within which the control element receives the output signal from the controller remain the same. This is achieved by having the control element receives the output signal of timing-device controller 134 half the time, and having the control element receive a neutral signal AN half the time. Neutral signal AN is selected so that slide valve 105 is in a position in which neither an inflow nor a discharge is possible, i.e. timing-device piston 155 remains in its position.

Figure 2:
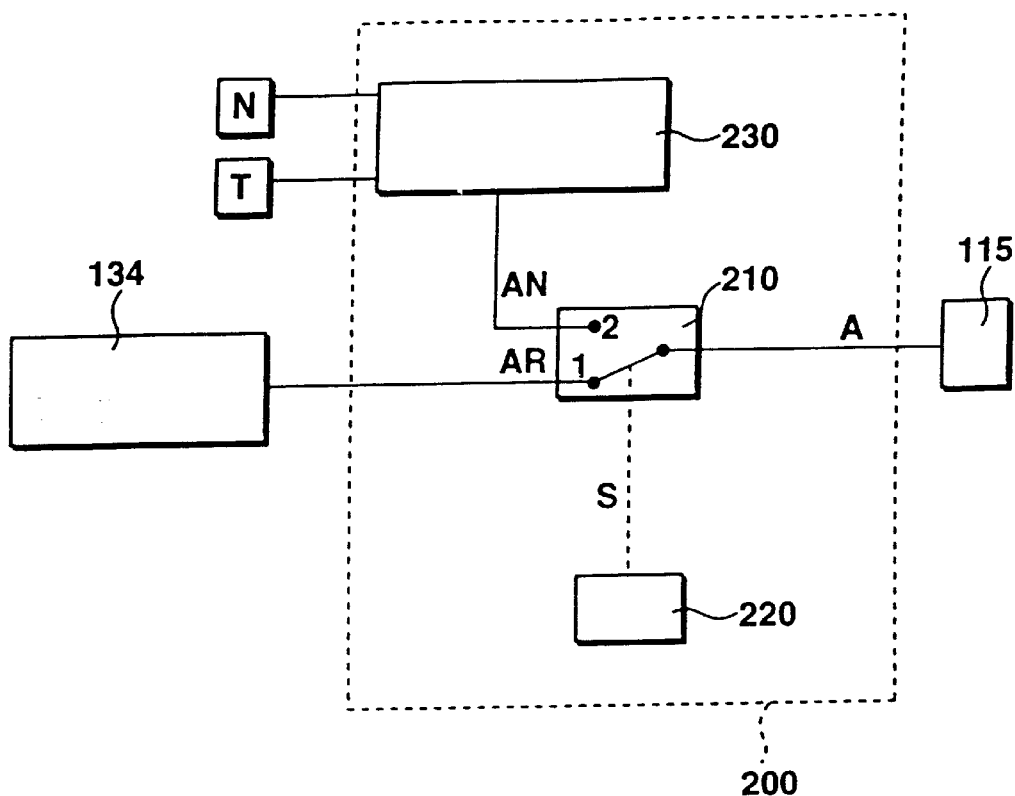
FIG. 2 shows a block diagram of the control structure of the present invention.

Shown in FIG. 2 is a section of FIG. 1 in detail. Output signal AR of timing-device controller 134 is applied to a first input of a switching element 210. The output signal AN of a neutral-value selection 230 is applied at the second input of switching element 210.

The switching element 210 receives driving signals S from a switching unit 220 and connects selectively the first or the second input with its output. The output of switching element 210 is connected to coil 115.

In a first specific embodiment, a constant value is stored as a neutral value in a memory. This means neutral-value selection 230 is formed as a memory element. In a particularly advantageous refinement, neutral value AN is preselected as a function of operating parameters. Thus, neutral-value selection 230 can be developed as a family of characteristics in which neutral value AN is stored as a function of operating parameters. This has proven to be advantageous, since because of hydraulic effects and other effects, different driving signals are necessary so that slide valve 105 remains in its position. It is particularly advantageous if a variable corresponding to the speed of the internal combustion engine and a variable indicating the temperature, particularly the fuel temperature, is used.

Switching unit 220 furnishes a periodic signal S which switches the switch alternately into its first and into its second position. In this context, the output signal of the control unit or the neutral signal AN of neutral-value selection 230 is supplied selectively to the control element. Preferably, provision is made for the switch to be in the one position 50% of the time, and in the other position 50% of the time. If, for example, timing-device controller 134 calculates the value every 10 ms, then switching element 210 is in the one position 5 ms, and in the other position 5 ms.

Neutral-value selection 230, switching element 210 and switching unit 220 are designated as intelligent timer unit 200.

Figure 3:
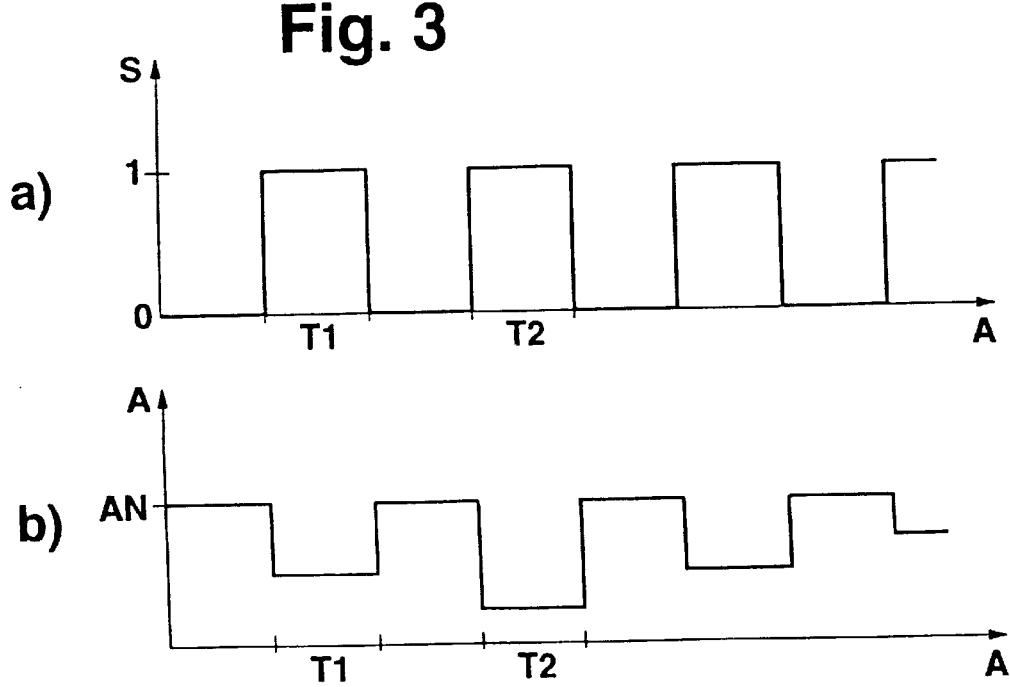
FIG. 3 shows various signals plotted over time.

The various signals are plotted in FIG. 3 over time t. Part a) of FIG. 3 plots a periodic signal S supplied by switching unit 220. Signal S assumes a first value 1 during a first time T1 and a second value 0 during a second time T2. In the specific embodiment shown, the two times are identical and have the value of 5 ms. The times can also assume different values.

Part b) of FIG. 3 plots a signal A which is received by coil 115. During the first time T1, switching element 210 is in its first position and signal A assumes the value of signal AR. As a rule, this signal assumes different values. During the second time T2, switching element 210 is in its second position, and signal A corresponds to neutral value AN. Its value is constant in the example shown.

In the exemplary embodiment shown, timing-device controller 134 calculates the manipulated variable every 10 ms. According to the present invention, this updating rate of manipulated variable A is oriented to the acquisition of the actual value and/or to the computer load. An updating rate oriented to the acquisition of the actual value means that timing-device controller 134 recalculates variable AR in the time intervals during which actual value SBI is also acquired. In the specific embodiment shown, this means that the actual value is acquired every 10 ms. An updating rate oriented to the possible computer load means that the calculation is carried out during the time intervals in which the computer can perform the calculation.

With the aid of intelligent timer unit 200, this period of time is divided into two parts. In the exemplary embodiment shown, they are two periods of time of 5 ms each. During the first period of time, the manipulated variable calculated by timing-device controller 134 is fed to coil 115. During the second part, the control element receives the neutral signal. In this manner, the movement of the control element, especially of timing-device piston 155, is stopped, or its acceleration is reduced. The neutral signal is almost constant. Therefore, virtually no additional computing power is needed to provide this variable.

The method of the present invention makes it possible to realize a feedback control circuit which has high dynamic response and which reacts quickly to changes, while the computer load increases only insignificantly. The highly dynamic control element is damped in its action with respect to the controller. The effective manipulated-variable range is widened in small-signal operation, which occurs with small system deviations, and permits a rugged controller design. This means controller accuracy is improved in small-signal operation. The restriction of the manipulated-variable range in large-signal operation, which occur with large system deviations, is insignificant, since the adjusting speed of the control element is very high, and the adjustment is also assured in half the time.

The method of the present invention simulates a very high updating rate of the manipulated variable (every 5 ms) for the final controlling element, although the controller, and thus the control device is loaded with only a substantially lesser rate (10 ms). The method of the present invention yields the advantages of a shortened time during which the controller is active without its disadvantages, including the high computer load.

What is claimed is:

1. A method for controlling a control element in an open loop, comprising the steps of:
   preselecting a driving value for driving the control element using a control unit; and
   applying the driving value and a neutral value alternately to the control element.

2. The method according to claim 1, wherein the driving value is preselected in fixed intervals.

3. The method according to claim 1, wherein:
   a first length of time that the driving value is applied to the control element is a first time interval;
   a second length of time that the neutral value is applied to the control element is a second time interval; and
   a relationship between the first time interval and the second time interval is definitively preselected.

4. The method according to claim 3, wherein the first time interval and the second time interval have the same length.

5. The method according to claim 1, wherein the neutral value is stored in a family of characteristics as a function of operating parameters.

6. The method according to claim 5, wherein the operating parameters include at least one of an engine speed and a temperature.

7. The method according to claim 3, wherein the first time interval is a function of an updating rate of an actual-value acquisition.

8. The method according to claim 3, wherein the first time interval is a function of a possible computer load.

9. A device for controlling a control element in an open loop, comprising:

a control unit for preselecting a driving value to be applied to the control element; and means for applying the driving value and a neutral value alternately to the control element.

* * * * *